US011720955B2

(12) United States Patent
Chuah (10) Patent No.: US 11,720,955 B2
(45) Date of Patent: Aug. 8, 2023

(54) OFFLINE TO ONLINE MANAGEMENT SYSTEM

(71) Applicant: Khai Gan Chuah, Austin, TX (US)

(72) Inventor: Khai Gan Chuah, Austin, TX (US)

( * ) Notice: Subject to any disclaimer, the term of this patent is extended or adjusted under 35 U.S.C. 154(b) by 149 days.

(21) Appl. No.: 17/302,281

(22) Filed: Apr. 29, 2021

(65) Prior Publication Data

US 2021/0342933 A1 Nov. 4, 2021

Related U.S. Application Data

(63) Continuation of application No. 16/224,518, filed on Dec. 18, 2018, now Pat. No. 11,042,928, which is a continuation of application No. 15/065,857, filed on Mar. 10, 2016, now abandoned.

(51) Int. Cl.
*G06Q 30/00* (2023.01)
*G06Q 30/08* (2012.01)

(52) U.S. Cl.
CPC ................................. *G06Q 30/08* (2013.01)

(58) Field of Classification Search
CPC ............... G06Q 30/00; G06Q 30/0601; G06Q 30/0627; G06Q 30/0629; G06Q 30/0631; G06Q 30/0641
See application file for complete search history.

(56) References Cited

U.S. PATENT DOCUMENTS

| 4,466,054 | A | * | 8/1984 | Shigemasa | ......... | G05B 13/0245 |
| | | | | | | 318/636 |
| 5,640,494 | A | * | 6/1997 | Jabri | ...................... | G06N 3/084 |
| | | | | | | 706/30 |
| 10,681,519 | B1 | | 6/2020 | Zalewski et al. | | |
| 10,713,620 | B2 | | 7/2020 | Tucker et al. | | |
| 10,977,907 | B1 | | 4/2021 | Zalewski et al. | | |
| 11,042,928 | B2 | | 6/2021 | Chuah | | |
| 2003/0163399 | A1 | | 8/2003 | Harper et al. | | |
| 2006/0015449 | A1 | * | 1/2006 | Underwood | ........... | G06Q 40/00 |
| | | | | | | 705/37 |
| 2006/0149640 | A1 | | 7/2006 | Gordon et al. | | |
| 2007/0034694 | A1 | | 2/2007 | Jensen et al. | | |

(Continued)

OTHER PUBLICATIONS

Foo, Schubert. "Online virtual exhibitions: Concepts and design considerations." DESIDOC Journal of Library & Information Technology 28.4 (2008): 22. (Year: 2008).*

(Continued)

*Primary Examiner* — Christopher B Seibert
(74) *Attorney, Agent, or Firm* — Craige Thompson; Thompson Patent Law; Timothy D. Snowden (57) ABSTRACT

O2O (Offline to Online) Management System is a computer-implemented service which manages the operation and interaction among the brick-and-mortar stores, merchants, warehouse and product providers. It also manages the purchase transactions by the customers at online marketplace and the brick-and-mortar stores. Unlike the online shopping services which provide only storefront Web access, the O2O Management System integrates the transaction and operation of online marketplace, brick-and-mortar retail stores, merchants, warehouses and product providers with a network of computer systems, such as internet. The transaction of O2O Management System occurs in the combination of physical retail facility (retail store) and internet.

30 Claims, 7 Drawing Sheets

(56) References Cited

U.S. PATENT DOCUMENTS

| | | | |
|---|---|---|---|
| 2008/0159634 A1* | 7/2008 | Sharma | G06V 20/52 |
| | | | 382/224 |
| 2009/0039107 A1 | 2/2009 | Sripada et al. | |
| 2009/0296378 A1 | 12/2009 | Demarest et al. | |
| 2010/0257017 A1 | 10/2010 | Mixson et al. | |
| 2010/0262282 A1 | 10/2010 | Segal et al. | |
| 2010/0324973 A1* | 12/2010 | D'Ambrosio | G06Q 30/02 |
| | | | 705/344 |
| 2012/0158522 A1* | 6/2012 | Nazer Zadeh | G06Q 30/0275 |
| | | | 705/14.71 |
| 2012/0166271 A1 | 6/2012 | Wofford et al. | |
| 2012/0253926 A1* | 10/2012 | Chen | G06Q 10/06 |
| | | | 705/14.49 |
| 2013/0226826 A1 | 8/2013 | Hathaway et al. | |
| 2013/0275256 A1 | 10/2013 | Emoff | |
| 2014/0100942 A1 | 4/2014 | Konevic | |
| 2014/0149083 A1* | 5/2014 | Sellem | G06Q 30/0601 |
| | | | 703/1 |
| 2014/0172641 A1 | 6/2014 | Sharma | |
| 2014/0278978 A1 | 9/2014 | O'Connor et al. | |
| 2015/0100463 A1 | 4/2015 | Drazin | |
| 2015/0317586 A1* | 11/2015 | Kassman | G06Q 40/03 |
| | | | 705/7.23 |
| 2016/0019717 A1* | 1/2016 | Yopp | G06T 19/20 |
| | | | 345/633 |
| 2016/0117744 A1 | 4/2016 | Oayda et al. | |
| 2016/0267570 A1 | 9/2016 | Hodges | |
| 2016/0381332 A1 | 12/2016 | Stout | |
| 2017/0262933 A1 | 9/2017 | Chuah | |
| 2019/0089932 A1 | 3/2019 | Oostendorp et al. | |
| 2019/0171194 A1 | 6/2019 | Sato et al. | |
| 2020/0143620 A1 | 5/2020 | Jafa et al. | |
| 2020/0233406 A1 | 7/2020 | Chien | |
| 2020/0302169 A1 | 9/2020 | Short et al. | |
| 2020/0320581 A1 | 10/2020 | Lee | |
| 2021/0256771 A1 | 8/2021 | Nemeth et al. | |

OTHER PUBLICATIONS

Cagan, Jonathan, Kenji Shimada, and Sun Yin. "A survey of computational approaches to three-dimensional layout problems." Computer-Aided Design 34.8 (2002): 597-611. (Year: 2002).*

Khai Gan Chuah, "Automatic Retail Display Management," U.S. Appl. No. 17/453,843, filed Nov. 6, 2021.

U.S. Appl. No. 17/302,281, filed Apr. 29, 2021, Khai Gan Chuah.

Karamshuk, Dmytro, et al. "Geo-spotting: mining online location-based services for optimal retail store placement." Proceedings of the 19th ACM SIGKDD international conference on Knowledge discovery and data mining. 2013. (Year: 2013), retrieved from the internet Aug. 30, 2021 <https://arxiv.org/abs/1306.1704>.

* cited by examiner

OFFLINE TO ONLINE MANAGEMENT SYSTEM

CROSS-REFERENCE TO RELATED APPLICATIONS

This application is a Continuation and claims the benefit of U.S. application Ser. No. 16/224,518, titled "Offline to Online Management System," filed by Khai Gan Chuah on Dec. 18, 2018, which application is a Continuation and claims the benefit of U.S. application Ser. No. 15/065,857 titled "Offline to Online Management System" filed by Khai Gan Chuah on Mar. 10, 2016.

This application incorporates the entire contents of the foregoing application(s) herein by reference.

FIELD OF THE INVENTION

The present invention is directed to an Offline to Online (O2O) Management System using a computer-implemented system that unites physical spaces which are intended retail purposes and merchants with their product provider, in a management system of drop-ship business model to bring a product from his manufacturer to consumer. O2O (Offline to Online) retain transaction occurs in the combination of physical retail space and internet.

DESCRIPTION OF THE RELATED ART

U.S. Patent 2006/0149640 A1 revealed a business method providing a dedicated electronic shopping network having a database and wireless receiving device to independent retailers for lease. The method is limited by rigid processes that manages retail space renting, product viewing, product distribution and monetary transaction. One of the limitations is in the localization, where the network is a closed or private computer network is still confined to near the premises of the retail facility. Database information of the products has to be supplied by the retail entities (Merchant) and management of the retail sites are done locally. Most of the time, the merchant who rent the retail space is the party who actually also in the retail operation (i.e. manage the store) hence they may have to live within the region or hire a local management company to carry out daily retail operation.

O2O Management System utilizes web platform and computer databases to link up all available physical retail spaces, trading post, kiosk, sales booth, brick-and-mortar stores, and retail entities such as merchants, product provider globally to facilitate the retail transaction. It provides a dynamic management system that includes intelligence for decision making to match the merchants, product suppliers and retail sites; it provides design guide and setting up of showcase at the physical spaces which are intended retail purposes; manages the sample shipping and replacement services; product drop ship services and business transaction and payment services to the parties.

Unlike the typical online shopping services which provide only storefront Web access, O2O Management System in not limited to the a typical independent retailer or merchant who is required to present its own product upfront in or to participate in the business method. The system is able to aide merchants in obtaining products to be sold by providing a selection of products listed by product providers.

SUMMARY

O2O Management System is an independent business management system which utilizes the web platform and computer databases to link up the all available physical spaces, brick-and-mortar stores, merchants, product provider globally to facilitate the retail transaction. The system allows product providers to expose their products in a broader marketplace, online and offline. One of the major benefits of O2O Management System is the opportunity to include any individual as a merchant without having to present any product upfront. By the unique linking of merchants and product providers in a global fashion, O2O Management allows a broader visibility and versatility of products being in the online and offline marketplace. The system helps merchants to setup a marketplace without having a huge startup capital by providing showcase template to ease work of setting up product showcases. O2O Management can further construct, build, ship and set up the physical showcase for merchant at designated retail facility. The system also helps merchants manage their business by managing monetary transactions, shipments of display sample and products to customer.

In addition offering the product showcase template to its members based on information received. The purpose of using O2O Management System showcase templates is to ensure the conformity of retail spots showcase design and appearance for a specific product. For example, based on the trends, a baby product is preferred to be displayed at showcase with white background, whilst, electronic products may be displayed on a richer color background and decorated with spot lights. Alternatively, the O2O Management System also accepts personalized showcase templates from its members. The O2O Management estimates and compares the information submitted by the members and generates a list of matching showcase design templates for the members to select. The O2O Management System may come with build-in artificial intelligent software to generate showcase templates for members to select. The design templates can be in the form of electronic document such as Computer-aided design (CAD) graphic files which can be printed by the member and later to have the local contractor to custom build. In addition, it also handles the product sample shipping process by either notifying the member to ship the product to a particular showcase address, or shipping the product sample directly from his own warehouse. It also manages the purchase transactions by the customers at the physical retail sites or brick-and-mortar stores. Another service of O2O Management System provides is the ability to handle the purchased item shipping process by either notifying the member to ship the purchased item to the customer's designated address, or shipping the purchased item directly from its own warehouse.

DEFINITIONS

The term "drop shipping" is used herein to denote the retail transaction by transferring a customer's order to manufacturer (or other third party, e.g., vendor, supplier, wholesaler, distributor, retailer, etc.), which then ships the ordered item directly to customer. Drop shipping, may, in some cases, allow the merchant to avoid cost associated with stocking items in its own inventory.

The term "merchant" is used herein to denote an individual, a company or legal entity that sells product in a retail facility. The sales transaction is completed only when the customer receives the purchase item at his/her designated address.

The term "retail facility" is used herein to denote a physical site, building or an open space such as patio, sidewalk that is usable by retail provider in drop-ship business. An item may be sold at the retail facility but store itself may not necessary carry the stock inventory.

The term "retail provider" used herein to designate an individual, a company or other legal entity that possesses the authority to rent or lease a space of an architectural facility for operation purposes. An architectural facility may be a retail facility or a non-commercial private property.

The term "retail spot" denotes a space usable for product showcase to display sample products in a retail facility. A retail spot may be divided into segments. Each segment represents a product showcase with specific dimensions. These showcases can be subleased to third parties via O2O Management System. The retail spot may consist of a structure within a retail facility such as trading post, kiosk, sales booth, wall, platform or store fixtures such as shelves, table tops, and counters with specific dimension tagged with retail spot identification.

The term "retail spot identification" or "RID" denotes the unique identification system for a particular retail spot.

The term "showcase template" denotes a distinct layout design of a retail spot.

The term "open space retail spot" denotes an unfurnished retail spot which can be custom designed by the member of O2O Management System.

The term "product provider" is used herein to denote a product supplier or other legal entities who warehousing the products and engaging in drop-ship business.

The term "product identification" or "PIN" denotes the identification system for a particular product.

The term "customer" can be of any entity or individual who purchases products at the retail facility.

The term "member" is used herein to denote any member who signs up with the O2O Management System such as retail provider, merchant or product provider.

The term "member ID" denotes the identification system for the member who signs up O2O Management System such as retail provider, merchant or product provider.

DETAILED DESCRIPTION

Figure 1:
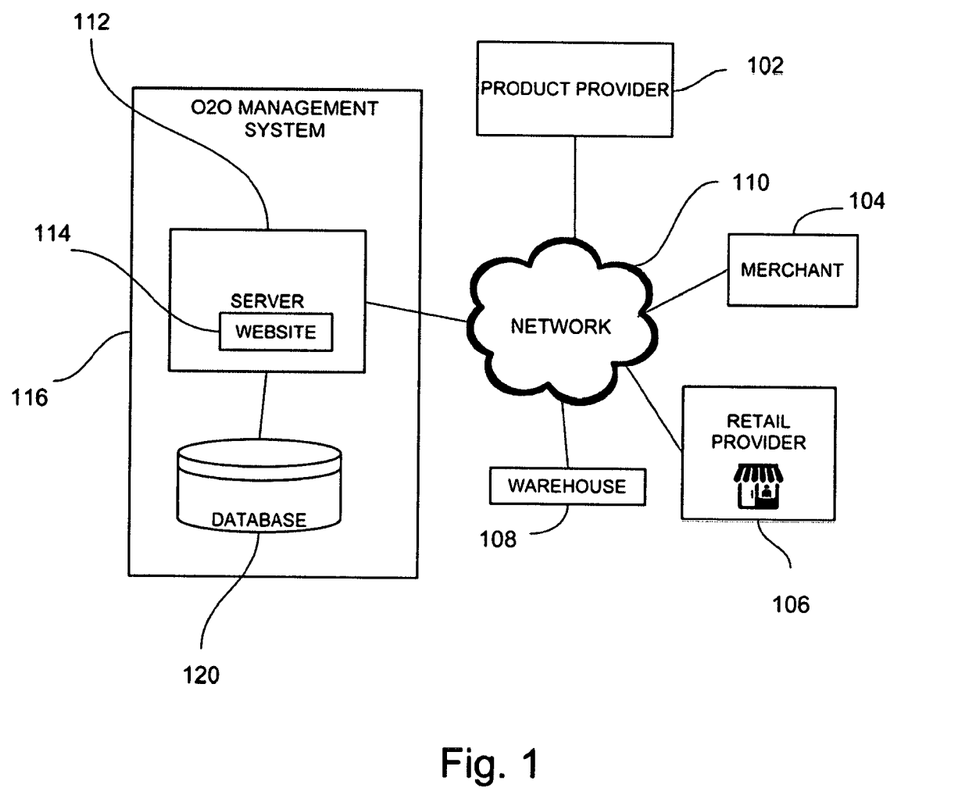
FIG. 1 is a flowchart that illustrates the principal components of the preferred embodiment of O2O Management System.

FIG. 1 illustrates the principal components of the preferred embodiment of O2O Management System 116 which is implemented using highly scalable and reliable web application servers 112 and plurality of databases 120. The merchant 104, product provider 102, warehouse 108, and retail provider 106 can access the O2O Management System 116 via the web browser or mobile app running on the computer or smart device (tablet, phone, etc.). These parties communicate to O2O Management System's website 114 through a secured internet network 110 which is preferably the https protocol. A merchant 104, retail provider 106, warehouse 108 or product provider 102 using the computer, interacts with the O2O Management System 116 that is serviced by server(s) and database(s).

In the context of the present disclosure, actions indicated as being taken by the merchant 104, retail provider 106, warehouse 108, or product provider 102 are preferably performed by or through, as applicable, the web browser and/or mobile web apps on the computer and smart device. Actions indicated as being taken by the O2O Management System 116 are preferably performed by or through, as applicable, O2O Management System 116 servers and his associated software components. The computers and servers referenced herein are preferably of general purpose computers, although application-specific hardware could be used to perform certain tasks.

Figure 2:
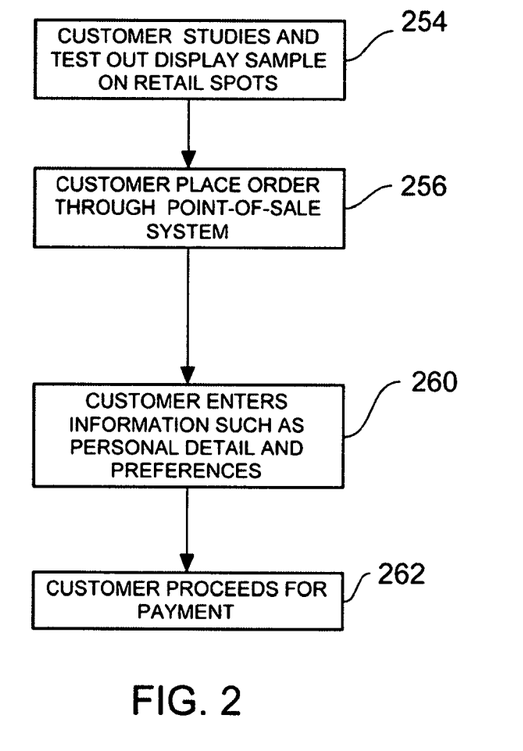
FIG. 2 is a flowchart that illustrates the purchase transaction of a customer at a brick-and-mortar retail store utilizing O2O Management System.

As depicted, FIG. 2 illustrates the purchase transaction of a customer at a brick-and-mortar retail store utilizing O2O Management System 116. At the store location, the customer studies and tests out the sample(s) displayed on the retail spots (step 254). Each retail spot is tagged or labeled with unique Retail Identification (RID). Each product is also tagged or labeled with unique Product Identification (PIN) and/or UPC code. The onsite purchase transaction can be done the customer presenting the merchandise to the point-of-sale system either by scanning or by manually keying in the PIN and/or UPC codes. At Point-of-Sale (POS) (step 256), the transaction information such as payment method, delivery method (i.e. FedEx or UPS) as well customer's personal details can be entered on the POS system, self-serviced or with the help of the store assistants (step 260). The point-of-sale system can also be a self-service kiosk, online shopping site or apps on mobile device connected to the O2O Management System 116 through a secured internet communication. The information will be submitted to O2O Management System 116 via internet. The customer may select a product supplier from the list of product providers offered by the marketplace of O2O Management System 116 and proceed to complete the transaction by paying on the spot or via internet payment service (step 262). Alternatively, the O2O Management System 116 can automatically assign a product provider 102 for the transaction without having customer making any selection. Once purchase transaction has completed, the selected product provider 102 will be notified by the O2O Management System 116 to ship the merchandise to customer's designated shipping address. The monetary transaction will be managed by the O2O Management System 116, where the transaction will be deposit to the bank account designated by O2O Management System. After deducting the cost, O2O Management System 116 will issue the payment accordingly to his members.

Figure 3:
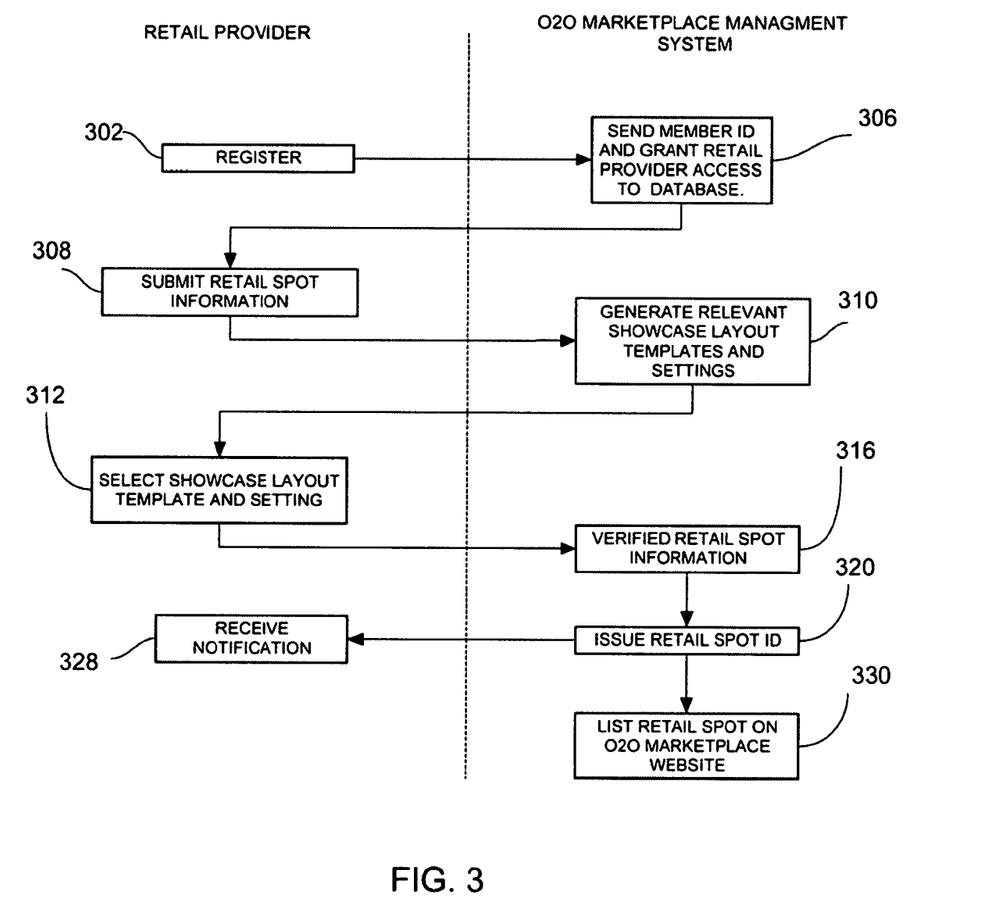
FIG. 3 is a flowchart that illustrates the process of submitting the retail spot to O2O Management System by the retail provider.

FIG. 3 illustrates the process of submitting the retail spot to O2O Management System 116 by the retail provider 106. A retail provider 106 registers (step 302) its information to the O2O Management System marketplace website 114. A retail provider may submit a furnished or an unfurnished retail spot such as a corner of a building, wall, patio or any physical sites. An unfurnished retail spot can then be assigned as open-space in the attribute.

Upon registering, the retail provider 106 receives a member ID (step 306) and proceeds to submit its retail spot information to O2O Management System 116 (step 308). The retail spot information of a retail facility are provided by retail provider; such as store address, product category, the number of showcases or retail spots available, showcase dimension (Length×Width×Height), the maximum product weight allowance for each retail spot fixtures, terms & conditions, preferred patterns, colors, open-space (Yes or No) and other attributes. Based on the information received, O2O Management System 116 will generate a list of relevant showcase layout templates (step 310) for the retail provider 106 to select and build on spot (step 312).

If the retail spot has been assigned as open-space in the attribute, the O2O Management System 116 may accept a personalized showcase design setting from its members, for example NIKE®, Inc. may prefer its unique brand characteristic in-sync with the shoe retail spot at a retail facility. Once O2O Management System 116 verifies the retail spot information and its member is in compliance to the setup guideline (step 316), a RID will be issued (step 320) and the notice of confirmation (step 328) will be sent to retail provider 106.

Once the retail spot has listed, it will become searchable on O2O Management System marketplace website 114 (step 330), being made available to merchants for rental. It is to be noted that a retail spot may be utilized by O2O Management System or product providers as an outlet or storefront for their products.

The O2O Management System 116 will conduct retail spot design layout checking from time to time. The layout verification process includes but not limited to the images submission by the members, or manually inspected by authorized personnel to the retail facility. Once committed to O2O Management, the retail provider 106 may have to fulfill the following retail services on daily basis until the contract expired; by referring the PIN, display the product sample(s) according to the RID assigned, keep the samples in order and tidy, report O2O Management System 116 if there are samples missing or damaged, request sample replacements, send sales report to O2O Management System, manage the sales transaction by providing point-of-sale system such as store assistants, self-service kiosk, online shopping site or apps on mobile to facilitate the customer purchase transaction and other activities related to retail store operation (i.e. holiday closure days, store operating hours) and submit the store report to O2O Management 116 on regular basis.

Figure 4:
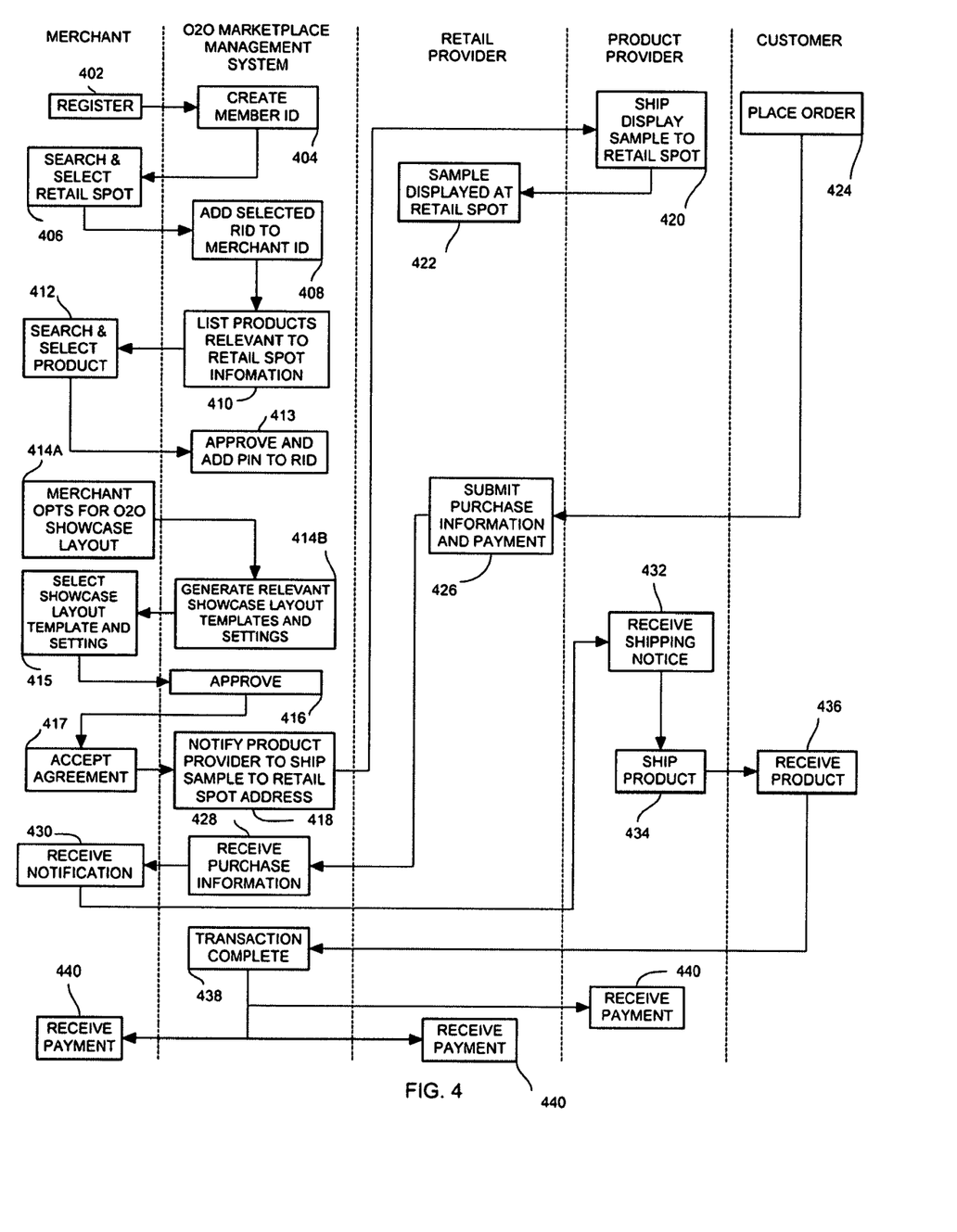
FIG. 4 is a flowchart illustrates the merchant selling third party product using O2O Management System at selected retail spot.

FIG. 4 illustrates the merchant 104 selling third party product using O2O Management System 116 at a selected retail spot. The merchant 104 registers (step 402) its information to the O2O Management System marketplace website 114. Upon registered the merchant 104 receives the member ID (step 404) from the O2O Management System 116 and the merchant 104 will proceed to access the database which lists the retail spots available globally. The merchant 104 searches and selects the relevant retail spot (step 406) information such as retail sector, product category, store location, retail spot dimension (Length×Depth×Height), maximum weight of each showcase fixture, lease terms & conditions and other attributes. If the retail spot is an open-space, the merchant 104 has the option to either select and accept the standardized showcase layout offered by O2O Management System. Once the O2O Management System 116 verifies and approves the customized setting of a particular retail spot, the merchant's information will be added to the selected RID (step 408). The matching algorithm proceeds to retrieve a list of products which matched the retail spot attributes in database (step 410). The list of products is tagged with a PIN. The O2O Management System 116 matching procedure compares the attributes of RID with PIN, for example a retail spot in Austin, Tex., baby product category, showcase dimension of 2'×2', etc. Next, the merchant 104 will proceed to select the desired product from the list of products provided by O2O Management System 116. When the merchant 104 select a product from the list (step 412), In this case, the PIN will be paired to the merchant's selected RID (step 413). It is to be noted that the sequence of retail spot and product selection may not necessary be in order. A merchant 104 may select a product first and retail spot later.

Once the paring is completed, the merchant 104 will decide the showcase layout options. If the selected showcase has never been setup at retail facility (i.e. open-space retail spot), the merchant 104 can either submit his own retail spot design setting to O2O Management System 116 (not shown in FIG. 4 flow chart) or the merchant 104 has the option to accept the said one of the standardized showcase templates offered by O2O Management System 116 (step 414A). Based on the information received, O2O Management System 116 will generate a list of relevant showcase layout templates (step 414B) for the merchant 104 to select and build at retail facility. When the showcase layout has been selected and finalized by the merchant (step 415), O2O Management System 116 will verify and proceed to approve the selection (step 416) and generates an agreement for the merchant. Once the merchant 104 accepts the agreement (step 417) and makes the payment to O2O, the O2O Management System 116 will inform the product provider 102 (step 418) to ship the sample to the selected retail spot address (step 420). When the retail facility received the sample, it will be displayed at the retail spot (step 422). Alternatively, the merchant 104 will contact the product provider 102 and request the sample to be shipped to selected retail spot. Alternatively, the O2O Management System 116 may handle the sample shipping process on behalf of merchant. In this case, the samples are stored at O2O Management System 116 designated warehouse 108 and shipped out by O2O Management System. A product can be assigned and linked to unlimited number of retail spots. When there are more than one merchant compete for a single retail spot, the allocation of retail spot can be done either by arbitrary process or auction system by the O2O Management System 116.

When a customer purchases an item (step 424), the purchase information and payment will be submitted by retail provider 106 (step 426) to O2O Management System 116. Upon receiving the payment (step 428), the merchant 104 will receive notification (step 430) from O2O Management System 116 and the merchant 104 will inform the product provider 102 to ship purchased merchandise to customer. The merchant 104 will receive notification stating the number of items sold via email and in his user account. The product provider 102 receives the shipping notice (step 432), and ship out the products to designated address (step 434). When the customer receives the product (step 436), the sales transaction is completed (step 438). The monetary transaction is management by the O2O Management System. The O2O management will issue the payment to merchant, product provider 102 and retail provider 106 at the end of billing cycle (step 440).

Figure 5:
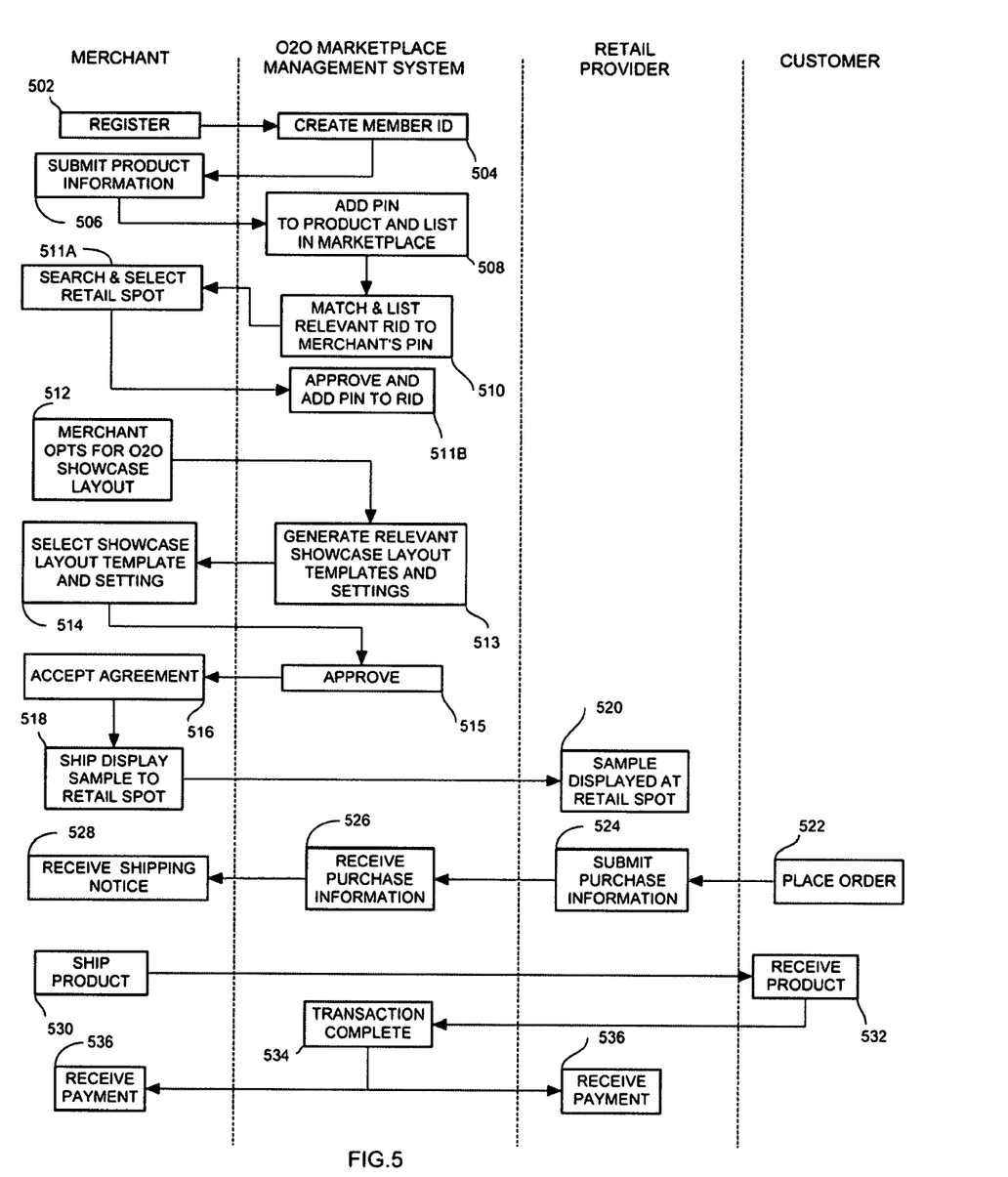
FIG. 5 is a flowchart that illustrates the merchant selling his own product using O2O Management System at its selected retail spot.

FIG. 5 illustrates the merchant 104 selling his own product using O2O Management System 116 at its selected retail spot. In this case, the merchant 104 is also a product provider 102. A merchant 104 registers (step 502) his information to the O2O Management System marketplace website 114. Upon registered, a member ID will be issued (step 504) and the merchant 104 will proceed to add new product to O2O Management System 116 (step 506). The product information include but not limited to product images, description, model number, universal product code (UPC), size, weight, cost, manufacturer name, suggested retail price (MSRP), shipping cost and other related attributes. The O2O Management System 116 assigns a PIN for each product listed on the marketplace website (step 508). The O2O Management System 116 will match the PIN with list of relevant RID in the database. The process is carried out by comparing both attributes of retail spot and merchant's product carried out by O2O Management System 116 computer software algorithm (step 510). For example, a product has following attributes; category; plush toy, dimension (length×wide×height): 8"×5"×6", weight: 1 lbs, preferred sales region: Texas is suitable for several retail spots Dallas, Tex. which shown the following retail spot attribute; baby toys, showcase dimension (length×width×height): 9"×9"×9", maximum weight 3 lbs, least term of six months, etc. Next, the merchant 104 will proceed to access the database which listed the retail spots available globally. After the merchant 104 selects a desired retail spot (step 511A), the O2O Management System 116 will review and validate merchant's request and assign the selected retail spot to merchant's selected product by paring the RID with merchant's PIN (step 511B). One product may be assigned and linked to unlimited number of retail spots. Once the paring is completed, the merchant 104 will decide the showcase layout options. If the selected showcase has never been setup at retail facility (i.e. open-space retail spot), the merchant 104 can either submit his own retail spot design setting to O2O Management System 116 (not shown in FIG. 5 flow chart) of the merchant 104 has the option to accept the said one of the standardized showcase templates offered by O2O Management System 116 (step 512). Based on the information received, O2O Management System 116 will generate a list of relevant showcase layout templates (step 513) for the retail provider 106 to select and build at retail facility. When the showcase layout has been selected and finalized by the merchant 104 (step 514), O2O Management System 116 will approve the selection (step 515) and generates an agreement for the merchant.

Once the merchant 104 accepts the agreement (step 516) and makes the payment to O2O, the paired RID and merchant's PIN will be listed in O2O Management System 116 marketplace website. The O2O Management System 116 will conduct retail spot design layout checking from time to time. The layout verification process includes but not limited to the images submission by the members, or manually inspected by authorized personnel to the retail facility. Once the showcase is ready, the merchant 104 will ship sample to the location of retail spot (step 518) and the sample will be displayed at the showcase (step 520). Alternatively, the O2O Management System 116 may handle the sample shipping process on behalf of merchant. In this case, the samples are stored at O2O Management System 116 designated warehouse 108 and shipped out by O2O Management System. When there is more than one merchant 104 competing for a single retail spot, the allocation of retail spot can be done either by arbitrary process or auction system by the O2O Management System. When a customer purchases an item (step 522), the purchase information and payment will be submitted by retail provider 106 (step 524) to O2O Management System. Upon receiving the purchase information (step 526), the O2O Management System 116 will inform the merchant 104 (step 528) and the merchant 104 ships out the products to designated address (step 530). The merchant 104 will also receive notification stating the number of items sold via email and in his business account. When the customer receives the product (step 532), the sales transaction is completed (step 534). The monetary transaction will be managed by the O2O management system. The O2O management will issue the payment to merchant 104 and retail provider 106 at the end of billing cycle (step 536).

Figure 6:
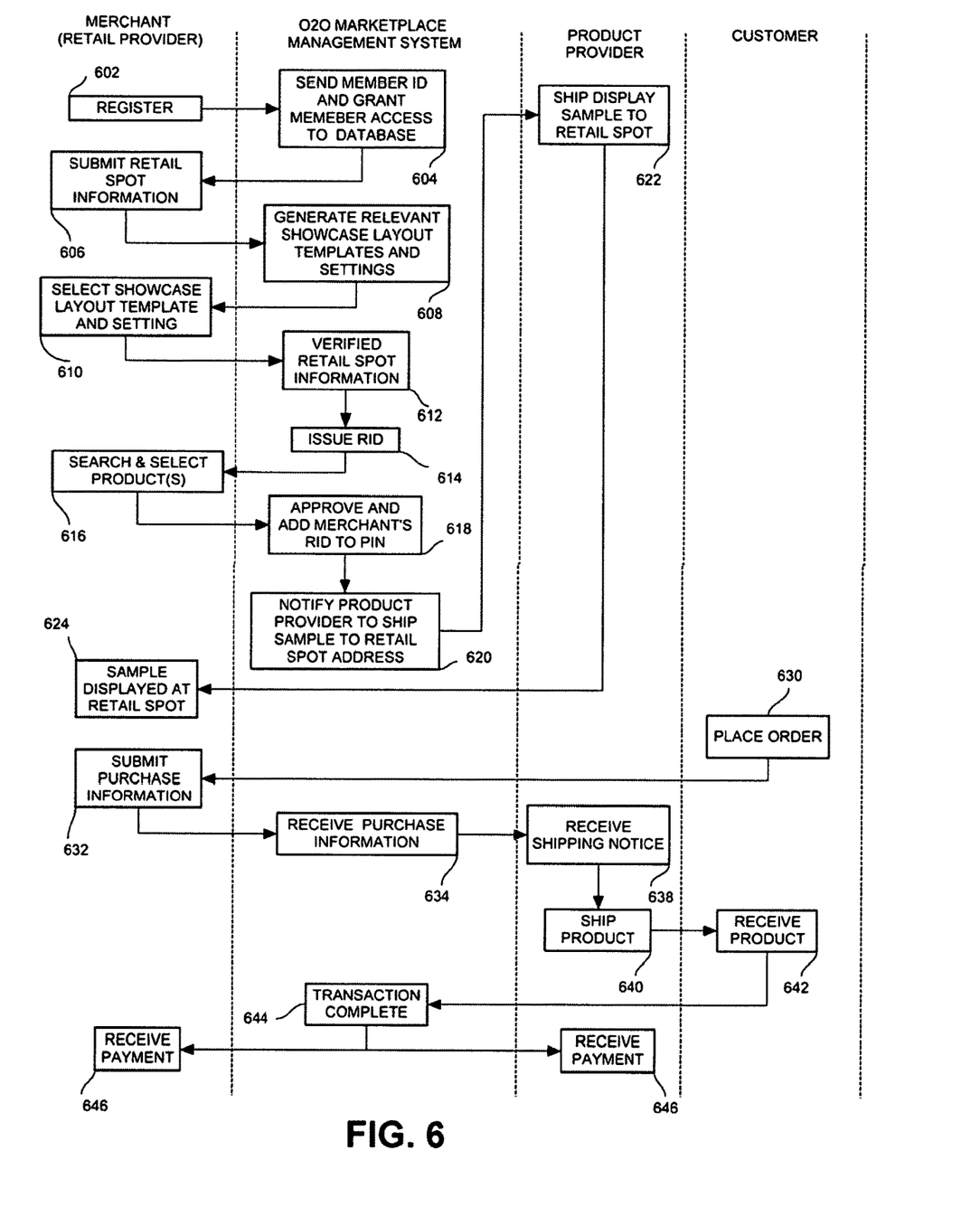
FIG. 6 is a flowchart that illustrates the merchant setup the retail spot at the retail facility via O2O Management System.

FIG. 6 illustrates the merchant 104 setup the retail spot at the retail facility via O2O Management System 116 at selected retail spot. In this case, the merchant 104 is also a retail provider 106. A merchant 104 registers (step 602) his information to the O2O Management System marketplace website 114. Upon registered the merchant 104 receives the member ID (step 604) and proceed to submit the said retail spot information to O2O Management System 116 (step 606). Based on the information received, O2O Management System 116 will generate a list of relevant showcase layout templates (step 608) for the merchant 104 to select and build at retail facility (step 610). If the retail spot has been assigned as an open-space in the attribute, the merchant 104 will have the option to submit its own showcase design setting to O2O Management System. It is to be noted that the O2O Management can further construct, build, ship and set up the physical showcase for merchant at designated retail facility. Once O2O Management System 116 verifies the retail spot information is in compliance with the setup guidelines (step 612), a RID will be issued (step 614) and the notice of confirmation will be sent to the merchant. It is to be noted that the sequence of issuing RID and showcase setup may not necessary in order. Once the retail spot has been listed, it will become searchable on the O2O Management System marketplace website 114. Next, the merchant 104 will proceed to select the desired product at O2O Management System website 114 (step 616). The list of products is tagged with a Product Identification Number (PIN). The O2O Management System 116 matching procedure compares the said attributes of RID with said attributes of PIN. The matching algorithm proceeds to retrieve a list of products that matches the retail spot attributes, and locates product providers who are willing to drop-ship the product to merchant's customers.

Once the RID has been paired with PIN (step 618), the O2O Management System 116 will inform the product provider 102 (step 620) to ship the sample to the address of the retail/spot (step 622). When the sample arrives at retail facility, it will be displayed by the merchant 104 at assigned retail spot (step 624). Alternatively, the merchant 104 can contact the product provider 102 and request a sample to be shipped to selected retail spot. The O2O Management System 116 can also handle the sample shipping process on behalf of the merchant. In this case, the samples are stored at O2O Management System designated warehouse 108 and shipped out by O2O Management System 116. Once committed to O2O Management, the merchant 104 must fulfill the said retail services on daily basis until the contract expired. When a customer purchases at item (step 630), the purchase information and payment will be submitted by merchant 104 (step 632) to O2O Management System 116. Upon receiving the purchase information (step 634), the O2O Management System 116 will send shipping notice to the product provider 102 (step 638) and the product provider 102 proceeds to ship out the products to designated address (step 640). When the customer receives the product (step 642), the sales transaction is completed (step 644). The monetary transaction will be managed by the O2O management system. The O2O management will issue the payment to merchant 104 and product provider 102 at the end of billing cycle (step 646).

One of the features of the O2O Management System 116 is the autonomous sample shipping process. From time to time, the retail spot's sample may experience wear and tear, damage or lost. When a showcase sample needs to be replaced or refilled, the O2O Management System 116 will ship out sample to the retail facility. This process can be done either manually request or automatic process. When it's automatic, the sample will be shipped out periodically under a specific time frame set by the member (i.e. 30 days) at the O2O Management user control panel. The sample management will assure the product sample displayed at retail spot is always fresh and attractive to customers.

Figure 7:
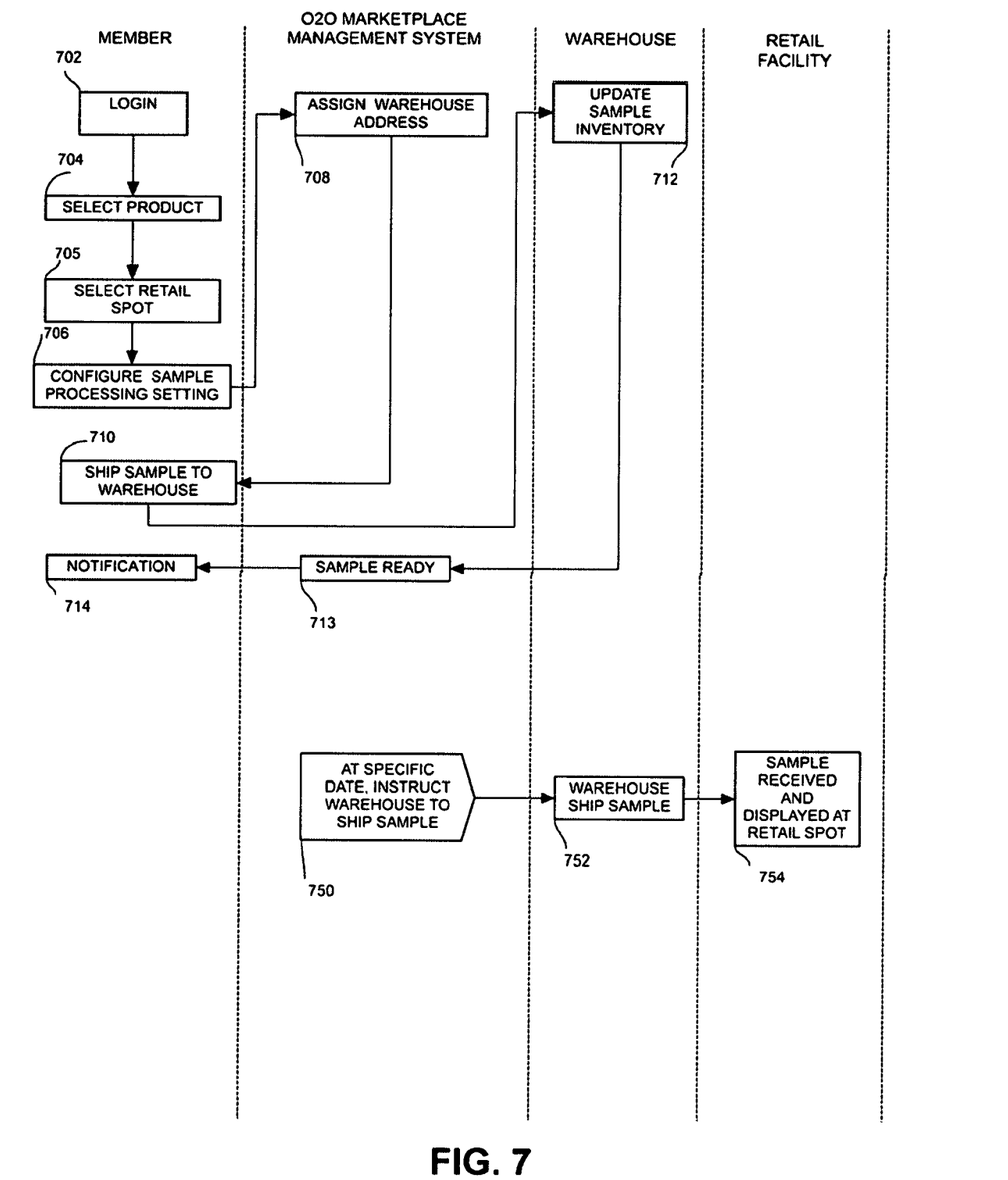
FIG. 7 is a flowchart that illustrates the sample shipping service offered and handled by O2O Management System.

FIG. 7 illustrates the sample shipping service offered and handled by O2O Management System. A member login (step 702) to the O2O Management System 116 user control panel and select the product (step 704). When the PIN has been selected, the member will proceed to select the target retail spot (step 705). It is to be noted that more than one retail spots can be selected. Next, the member will configure the time setting such as quantity per shipment, the date for sample to be shipped, delivery method and set the sample mode (i.e. one time or recurring) (step 706). Once the setting and configuration has been completed, the O2O Management System 116 sends the warehouse address (step 708) to member. Member will proceed to ship the samples (step 710) to its designated warehouse. O2O Management System 116 informed when the warehouse 108 receives the products (step 712). At this stage, the sample handling service is ready (step 713) and a notification will be sent out to member by O2O Management System 116 (step 714). When the pre-set date by member has come (step 750), O2O Management will send out notification to warehouse 108 and the warehouse 108 proceeds to ship out sample to the address of retail facility (step 752). When the sample arrives at retail facility and will be displayed by retail provider 106 at assigned retail spot (step 754).

While the invention is susceptible to various modifications and alternative forms, specific embodiments thereof are shown by way of examples in the drawings and will herein described in detail. It should be understood, however, that the drawings and detailed description thereto are not intended to limit the invention to the particular form disclosed, but on the contrary, the intention is to cover all modifications, equivalents and alternatives falling within the spirit and scope of the present inventions as defined by the appended claims. The headings used herein are for organization purposes only and not meant to be used to limit the scope of the description or the claims. As used throughout this application, the word "may" is used in a permissive sense (i.e., meaning having potential to), rather than the mandatory sense (i.e., meaning must). Similarly, the words "include", "including", and "includes" mean including, but not limited to.

The invention claimed is:

1. A computer implemented method to match and customize a physical space for an entity, the method comprising:
   in response to receiving, by at least one processor, a signal corresponding to a request for automatic showcase layout matching, performing operations comprising:
   receive, at at least one computing node over at least one network and via at least a first network interface, retail spot information pertaining to a retail spot, wherein the retail spot information comprises a product weight attribute associated with the retail spot;
   receive, at the at least one computing node over the at least one network and via at least a second network interface, product information pertaining to a product, wherein the product information comprises a product weight attribute associated with the product;
   in response to the signal and receiving the retail spot information and the product information, perform a matching algorithm, by the at least one processor and at the at least one computing node, comparing the retail spot information with the product information to determine showcase layout attributes, wherein the comparison comprises comparing the product weight attribute of the retail spot information with the product weight attribute of the product information;
   determine, by the at least one processor based on the showcase layout attributes determined by the comparison, at least one relevant showcase layout template; and,
   in response to receiving, by the at least one processor and over the network, an indication of selection of at least one specific showcase layout template by a user via at least a third network interface, then associate the at least one specific showcase layout template with at least one retail identification (RID) associated with a specific retail spot and with at least one product identification number (PIN) associated with the product information.

2. The method of claim 1, further comprising generate the signal in response to a merchant selecting a retail spot.

3. The method of claim 1, further comprising generate the signal in response to a merchant submitting a product.

4. The method of claim 1, further comprising generate the signal in response to a retail provider submitting a retail spot.

5. The method of claim 1, further comprising generate the signal in response to a retail provider selecting a product.

6. The method of claim 1, further comprising determine the at least one RID based on the request.

7. The method of claim 1, further comprising determine the at least one PIN based on the request.

8. The method of claim 1, further comprising, generate the signal in response to a merchant selecting the retail spot.

9. The method of claim 1, wherein the retail spot comprises a plurality of retail spots.

10. The method of claim 1, wherein the product comprises a plurality of products.

11. The method of claim 1, wherein the retail spot information comprises retail spot geolocation information.

12. The method of claim 1, wherein the product weight attribute of the retail spot information comprises a maximum product weight attribute.

13. The method of claim 1, wherein the retail spot information comprises length and depth of the retail spot.

14. The method of claim 1, wherein the product information comprises product dimensions comprising a height attribute.

15. The method of claim 1, wherein the comparison performed by the matching algorithm comprises comparing at least one further attribute of the retail spot information with a corresponding at least one further attribute of the product information.

16. The method of claim 1, wherein receive the retail spot information comprises retrieving predetermined retail spot information from a database.

17. The method of claim 1, wherein receive the product information comprises retrieving predetermined product information from a database.

18. The method of claim 1, wherein receive the product information comprises determine, from the signal, the product information.

19. The method of claim 1, wherein receive the retail spot information comprises determine, from the signal, the retail spot information.

20. The method of claim 1, wherein the at least one relevant showcase layout template comprises a personalized showcase template provided by the user.

21. The method of claim 1, wherein the at least one specific retail spot corresponds to at least one specific showcase.

22. The method of claim 1, wherein the retail spot information comprises an open-space attribute indicating whether the retail spot is an open space retail spot.

23. A computer program product (CPP) comprising a program of instructions tangibly embodied on a non-transitory computer readable medium wherein, when the instructions are executed on a processor, the processor causes operations to be performed to match and customize a physical space for an entity, the operations comprising:
in response to receiving, by at least one processor over a network and via at least one network interface, a signal corresponding to a request for automatic showcase layout matching, performing, via at least one computing node on the network, a first set of operations comprising:
receive, via the at least one network interface, retail spot information pertaining to a retail spot, wherein the retail spot information comprises a product weight attribute associated with the retail spot;
receive, via the at least one network interface, product information pertaining to a product, wherein the product information comprises a product weight attribute associated with the product;
in response to the signal and receiving the retail spot information and the product information, perform a matching algorithm, by the at least one processor, comparing the retail spot information with the product information to determine showcase layout attributes, wherein the comparison comprises comparing the product weight attribute of the retail spot information with the product weight attribute of the product information;
determine, by the at least one processor, of the at least one computing node on the network, based on the showcase layout attributes determined by the comparison, at least one relevant showcase layout template; and,
in response to receiving, by the at least one processor via the at least one network interface, an indication of selection of at least one specific showcase layout template by a user, then associate the at least one specific showcase layout template with at least one retail identification (RID) associated with a specific retail spot and with at least one product identification number (PIN) associated with the product information.

24. A system comprising:
a data store comprising a program of instructions; and,
at least one processor of at least one computing node on at least one network, the at least one processor operably coupled to the data store such that, when the at least one processor executes the program of instructions, the at least one processor causes operations to be performed in response to receiving a signal corresponding to a request for automatic showcase layout matching, the operations comprising:
receive, at the at least one computing node via at least one network interface, retail spot information pertaining to a retail spot, wherein the retail spot information comprises a product weight attribute associated with the retail spot;
receive, at the at least one computing node via at least one network interface, product information pertaining to a product, wherein the product information comprises a product weight attribute associated with the product;
in response to the signal and receiving the retail spot information and the product information, perform a matching algorithm, by the at least one processor, comparing the retail spot information with the product information to determine showcase layout attributes, wherein the comparison comprises comparing the product weight attribute of the retail spot information with the product weight attribute of the product information;
determine, by the at least one processor based on the showcase layout attributes determined by the comparison, at least one relevant showcase layout template; and,
in response to receiving, by the at least one processor via the at least one network interface, an indication of selection of at least one specific showcase layout template by a user, then associate the at least one specific showcase layout template with at least one retail identification (RID) associated with a specific retail spot and with at least one product identification number (PIN) associated with the product information.

25. A computer implemented method to match and customize a physical space for an entity, the method comprising:
in response to receiving, by at least one processor, a signal corresponding to a request for automatic showcase layout matching, performing operations comprising:
receive, at at least one computing node on a network via at least one network interface, retail spot information pertaining to a retail spot, wherein the retail spot information comprises a product weight attribute associated with the retail spot;
receive, at the at least one computing node via the at least one network interface, product information pertaining to a product, wherein the product information comprises a product weight attribute associated with the product;
in response to the signal and receiving the retail spot information and the product information, perform a matching algorithm, by the at least one processor, comparing the retail spot information with the product information to determine showcase layout attributes, wherein the comparison comprises comparing the product weight attribute of the retail spot information with the product weight attribute of the product information;
determine, by the at least one processor based on the showcase layout attributes determined by the comparison, at least one relevant showcase layout template;
receive, from a user at the at least one computing node and via the at least one network interface, a user-provided showcase layout template in response to the at least one relevant showcase layout template; and, in response to receiving, by the at least one processor, the user-provided showcase layout template from the user, then associate the user-provided showcase layout template with at least one retail identification (RID) associated with a specific retail spot and with at least one product identification number (PIN) associated with the product information.

26. The method of claim 25, wherein the at least one computing node comprises a server and the at least one network interface comprises a website interface.

27. The method of claim 1, wherein the at least one computing node comprises a server and at least one of the first network interface, the second network interface, and the third network interface comprises a website interface.

28. The method of claim 1, wherein at least one of the first network interface, the second network interface, and the third network interface are the same interface.

29. The CPP of claim 23, wherein the at least one computing node comprises a server and the at least one network interface comprises a website interface.

30. The system of claim 24, wherein the at least one computing node comprises a server and the at least one network interface comprises a website interface.

* * * * *